United States Patent
Goringe et al.

(10) Patent No.: US 7,200,122 B2
(45) Date of Patent: Apr. 3, 2007

(54) USING LINK STATE INFORMATION TO DISCOVER IP NETWORK TOPOLOGY

(75) Inventors: Christopher M. Goringe, Seven Hills (AU); Muneyb Minhazuddin, Quakers Hill (AU); James T. Peach, Artarmon (AU); Alastair J. Rankine, Boulder, CO (US); James D. Schreuder, Summer Hill (AU); Luke A. Tucker, Beacon Hill (AU); Alex M. Krumm-Heller, Gladesville (AU); Stephane C. Laveau, Glebe (AU)

(73) Assignee: Avaya Technology Corp., Basking Ridge, NJ (US)

( * ) Notice: Subject to any disclaimer, the term of this patent is extended or adjusted under 35 U.S.C. 154(b) by 160 days.

(21) Appl. No.: 10/127,967

(22) Filed: Apr. 22, 2002

(65) Prior Publication Data

US 2003/0043820 A1 Mar. 6, 2003

Related U.S. Application Data

(60) Provisional application No. 60/317,719, filed on Sep. 6, 2001, provisional application No. 60/347,050, filed on Jan. 8, 2002.

(51) Int. Cl.
*H04L 12/28* (2006.01)
*H04L 12/56* (2006.01)
(52) U.S. Cl. .................. 370/255; 370/389; 370/400
(58) Field of Classification Search ............... 370/254, 370/255, 400, 401
See application file for complete search history.

(56) References Cited

U.S. PATENT DOCUMENTS 4,556,972 A 12/1985 Chan et al.
4,644,532 A * 2/1987 George et al. ............... 370/255
5,136,690 A 8/1992 Becker et al. ............... 395/161
5,185,860 A 2/1993 Wu
5,226,120 A 7/1993 Brown et al. ................ 395/200
5,450,408 A 9/1995 Phaal ....................... 370/85.13
5,557,745 A 9/1996 Perlman et al. ......... 395/200.02

(Continued)

FOREIGN PATENT DOCUMENTS

EP 0 455 402 A1 11/1991

(Continued)

OTHER PUBLICATIONS

Moy, J. "OSPF Version 2" Mar. 1994, p. 62, pp. 68-76, and p. 85.*

(Continued)

*Primary Examiner*—Huy D. Vu
*Assistant Examiner*—Daniel Ryman
(74) *Attorney, Agent, or Firm*—Sheridan Ross P.C.

(57) ABSTRACT

A system for determining a topology associated with a network such as an enterprise network. The system includes a data collection agent 204 configured to (a) identify a first set of routers from among a larger, second set of routers in an enterprise network, (b) contact each of the routers in the first set of routers but not each of the other routers in the second set of routers, and (c) load network information maintained by at least some of the contacted routers in the first set of routers. The loaded network information can then be used to form a network or routing topology of the enterprise network.

64 Claims, 7 Drawing Sheets

U.S. PATENT DOCUMENTS

| | | | |
|---|---|---|---|
| 5,564,048 A | 10/1996 | Eick et al. .................. | 395/600 |
| 5,572,650 A | 11/1996 | Antis et al. .................. | 395/356 |
| 5,581,797 A | 12/1996 | Baker et al. ................ | 395/326 |
| 5,596,703 A | 1/1997 | Eick et al. .................. | 395/326 |
| 5,623,590 A | 4/1997 | Becker et al. .............. | 395/326 |
| 5,636,350 A | 6/1997 | Eick et al. .................. | 395/356 |
| 5,644,692 A | 7/1997 | Eick .......................... | 395/326 |
| 5,734,824 A | 3/1998 | Choi ..................... | 395/200.11 |
| 5,737,526 A | 4/1998 | Periasamy et al. ..... | 395/200.06 |
| 5,805,593 A | 9/1998 | Busche ....................... | 370/396 |
| 5,850,397 A * | 12/1998 | Raab et al. ................. | 370/392 |
| 5,881,246 A * | 3/1999 | Crawley et al. ............ | 709/238 |
| 5,943,317 A | 8/1999 | Brabson et al. ............. | 370/238 |
| 5,966,513 A * | 10/1999 | Horikawa et al. .......... | 709/223 |
| 6,088,451 A | 7/2000 | He et al. | |
| 6,108,702 A | 8/2000 | Wood | |
| 6,122,639 A | 9/2000 | Babu et al. ................. | 707/103 |
| 6,131,117 A | 10/2000 | Clark et al. ................. | 709/223 |
| 6,252,856 B1 | 6/2001 | Zhang | |
| 6,256,675 B1 * | 7/2001 | Rabinovich ................ | 709/241 |
| 6,269,398 B1 | 7/2001 | Leong et al. ............... | 709/224 |
| 6,269,400 B1 | 7/2001 | Douglas et al. ............ | 709/224 |
| 6,275,492 B1 | 8/2001 | Zhang | |
| 6,282,404 B1 | 8/2001 | Linton | |
| 6,360,255 B1 | 3/2002 | McCormack et al. ....... | 709/221 |
| 6,377,987 B1 | 4/2002 | Kracht ....................... | 709/220 |
| 6,405,248 B1 | 6/2002 | Wood ......................... | 709/223 |
| 6,418,476 B1 | 7/2002 | Luciani | |
| 6,430,612 B1 | 8/2002 | Iizuka ........................ | 709/223 |
| 6,442,144 B1 | 8/2002 | Hansen et al. .............. | 370/255 |
| 6,456,306 B1 | 9/2002 | Chin et al. .................. | 345/810 |
| 6,744,739 B2 * | 6/2004 | Martin ....................... | 370/254 |
| 6,859,878 B1 | 2/2005 | Kerr et al. | |
| 6,895,436 B1 | 5/2005 | Caillau et al. | |
| 2001/0034837 A1 | 10/2001 | Kausik et al. | |
| 2001/0049786 A1 | 12/2001 | Harrison et al. ............ | 713/156 |
| 2002/0087704 A1 | 7/2002 | Chesnais et al. ............ | 709/228 |
| 2002/0112062 A1 | 8/2002 | Brown et al. ............... | 709/229 |
| 2002/0116647 A1 | 8/2002 | Mont et al. .................. | 713/201 |
| 2002/0128885 A1 | 9/2002 | Evans | |
| 2002/0141593 A1 | 10/2002 | Kum et al. | |
| 2002/0144149 A1 | 10/2002 | Hanna et al. ............... | 713/201 |
| 2002/0161591 A1 | 10/2002 | Danneels et al. ............. | 705/1 |
| 2002/0188708 A1 | 12/2002 | Takahashi et al. | |
| 2003/0004840 A1 | 1/2003 | Gharavy | |
| 2003/0065626 A1 | 4/2003 | Allen | |
| 2003/0065940 A1 | 4/2003 | Brezak et al. | |
| 2003/0084176 A1 | 5/2003 | Tewari et al. | |
| 2003/0163686 A1 | 8/2003 | Ward et al. | |

FOREIGN PATENT DOCUMENTS

| | | |
|---|---|---|
| JP | 7-334445 | 12/1995 |
| JP | 2000-32132 | 1/2000 |
| JP | 2001-94560 | 4/2001 |

OTHER PUBLICATIONS

Y. Breitbart et al., "Topology Discovery in Heterogeneous IP Networks," Proceedings of IEEE Infocom 2000 (Mar. 2000), 10 pages.

B. Huffaker et al., "Topology Discovery by Active Probing," CAIDA (2002), 8 pages.

M. R. Meiss et al., "Standards-Based Discovery of Switched Ethernet Topology," Advanced Network Management Lab, (Apr. 2002), pp. 1-20.

R. Siamwalla et al., "Discovering Internet Topology," Cornell University (Jul. 1998), pp. 1-16.

PCT Written Opinion for Intl. App. No. PCT/US02/28467.

Matt Bishop et al., "Improving System Security via Proactive Password Checking," Computers and Security, 14(3) (1995), pp. 233-249.

J. Case, "A Simple Network Management Protocol," Network Working Group, Request for Comments 1067 (Aug. 1988), pp. 1-33.

Moy, J., Network Working Group, OSPF Version 2, Mar. 1994, pp. 62, 68-76, 85.

Jason Novotny et al., "An Online Credential Repository for the Grid: MyProxy" from High Performance Distributed Computing, 2001 Proceedings. Berkely, CA (Aug. 2001), pp. 104-111.

U.S. Appl. No. 10/122,888, filed Apr. 22, 2002, Goringe et al.

U.S. Appl. No. 10/122,938, filed Apr. 22, 2002, Goringe et al.

NET-SNMP, The NET-SNMP Project Homoe Page, Dec. 13, 2000, 5 pages, http://net-snmp.sourceforge.net.

OpenSSL, The Open Source Toolkit for SSL/TLS, Apr. 17, 2002, 2 pages, http://www.openssl.org.

Network Working Group, Management Information Base for Network Management of TCP/IP-based Internets: MIB-II, Mar. 1991, 62 pages, http://www.ietf.org/rfc/rfc1213.txt.

Network Working Group, The OSPF NSSA Option, Mar. 1994, 15 pages, http://www.ietf.org/rfc/rfc1587.txt.

Network Working Group, OSPF Version 2, Apr. 1998, 191 pages, http://www.ietf.org/rfc/rfc2328.txt.

Network Working Group, OSPF Version 2 Management Information Base, Nov. 1995, 71 pages, http://www.ietf.org/rfc/rfc1850.txt.

Network Working Group, RIP Version 2, Nov. 1998, 35 pages, http://www.ierf.org/rfc/rfc2453.txt.

Canadian Patent Office's Examiner's Report for Canadian Patent Application No. 2,457,718 date Aug. 9, 2005 (Atty. Ref. 4366-58-PCA).

Chinese Patent Office's First Office Action for Chinese Application No. 02817387.2 mailed Jun. 9, 2006 (Atty. Ref. 4366-58-PCN).

"Compuetr & Network LAN" vol. 18, No. 1, pp. 47-57 (Relevance described in Japanese Patent Office's First Office Action for Japanese Patent App. No. 2003/527620 mailed Sep. 11, 2006).

National Technical Report (including translated abstract), vol. 39, No. 1, pp. 63-71.

Japanese Patent Office's First Office Action for Japanese Patent App. No. 2003/527620 mailed Sep. 11, 2006 (Attorney's Docket No. 4368-59-PJP).

* cited by examiner

| ROUTER (400) | FLAG (404) |
|---|---|
| IP ADDRESS 1 | DONE |
| IP ADDRESS 2 | TRIED |
| IP ADDRESS 3 | DONE |
| IP ADDRESS 4 | NOT VISITED |
| IP ADDRESS 5 | NOT VISITED |
| ⋮ | ⋮ |
| IP ADDRESS N | NOT VISITED |

| REGION ID (504) | LSA (500) |
|---|---|
| 1 | LSA1 |
| 1 | LSA2 |
| 1 | LSA3 |
| ⋮ | ⋮ |
| 1 | LSAM |
| 2 | LSA1 |
| 2 | LSA2 |
| 2 | LSA3 |
| ⋮ | ⋮ |
| 0 | LSAM |

| ROUTER | ID | REGION ID | INTERFACE |
|---|---|---|---|
| 1 | $ID_1$ | 1 | A |
| 2 | $ID_2$ | 1 | B |
| 3 | $ID_3$ | 2 | C |
| ⋮ | ⋮ | ⋮ | ⋮ |
| N | $ID_N$ | 0 | Z |

700 — ID
704 — REGION ID

| LINK | END POINTS |
|---|---|
| 1 | ROUTER A |
|   | ROUTER B |
| 2 | ROUTER A |
|   | NETWORK C |
| ⋮ | ⋮ |
| M |   |

800 — LINK
804 — END POINTS

| NETWORK | ROUTER | DESIGNATED ROUTER |
|---|---|---|
| NETWORK 1 | AA | AAA |
| NETWORK 2 | BB | BBB |
| NETWORK 3 | CC | CCC |
| ⋮ | ⋮ | ⋮ |
| NETWORK P | ZZ | ZZZ |

| INTERFACE | ROUTER |
|---|---|
| IP ADDRESS 1 | AAAA |
| IP ADDRESS 2 | BBBB |
| IP ADDRESS 3 | CCCC |
| IP ADDRESS 4 | DDDD |
| ⋮ | ⋮ |
| IP ADDRESS N | ZZZZ |

FIG. 10

USING LINK STATE INFORMATION TO DISCOVER IP NETWORK TOPOLOGY

CROSS REFERENCE TO RELATED APPLICATIONS

The present application claims priority from U.S. Provisional Application Ser. No. 60/317,719, filed Sep. 6, 2001, of the same title, to Goringe, et al., and from U.S. Provisional Application Ser. No. 60/347,050, filed Jan. 8, 2002, entitled "Topology Discovery by Partitioning Multiple Discovery Techniques," to Goringe, et al, each of which is incorporated herein by this reference.

FIELD OF THE INVENTION

The present invention relates generally to networks and specifically to methods and devices for determining network or routing topology.

BACKGROUND OF THE INVENTION

Figure 1:
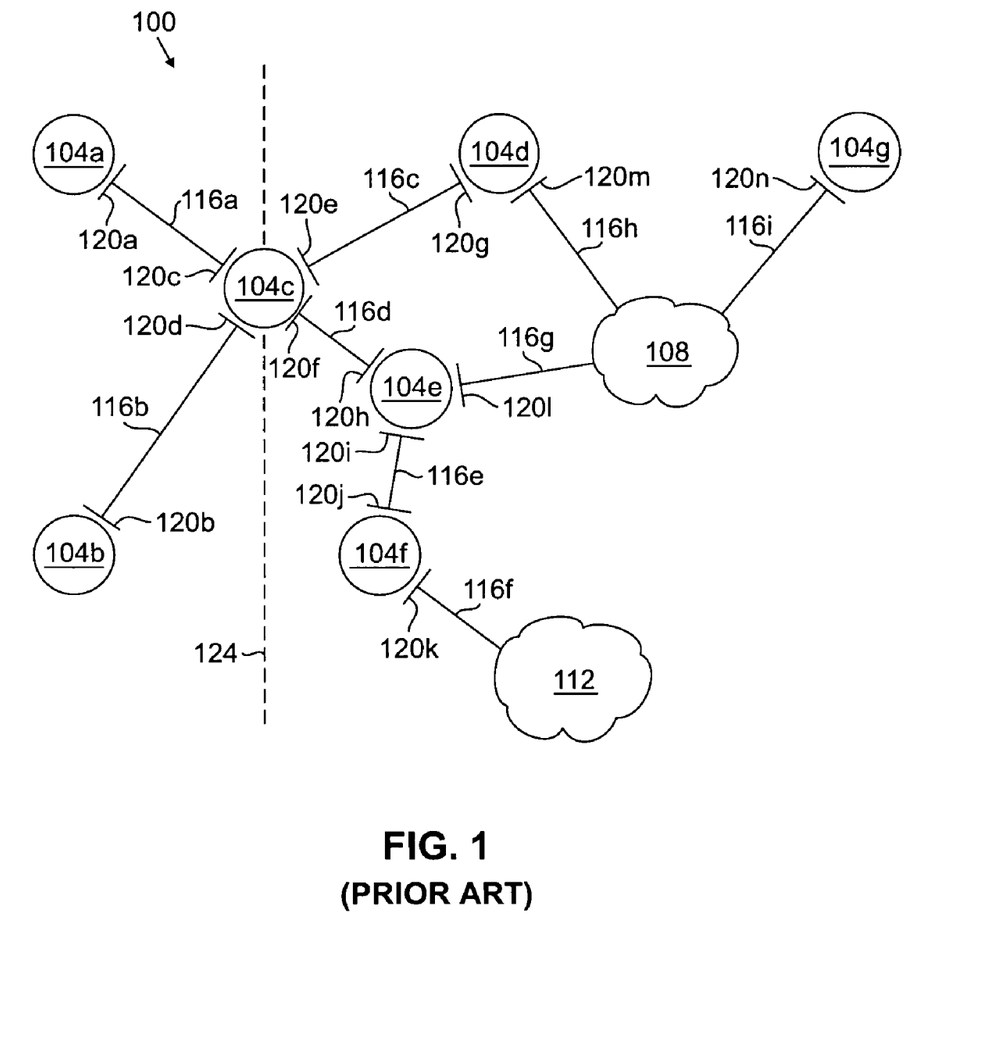
FIG. 1 depicts a simple network topology according to the prior art.

Distributed processing networks are gaining increasing importance in our information-based society. FIG. 1 depicts a network topology of a simple computer network. The network 100 comprises a plurality of routers 104a–g, a transit network 108, and a stub network 112, all interconnected by links 116a–i. As will be appreciated, a router is a device connecting two or more networks that routes incoming data or packets to an appropriate network/node; a transit network is a network containing more than one router; a stub network is a network containing only one router; and a link is a communication channel between two or more nodes. Each of the routers is typically attached to a link via one or more interfaces, such as interfaces 120a–n. The simple network of FIG. 1 is divided into two protocol regions with the dashed line 124 being the boundary between the two regions. Router 104c is located on the boundary 124 and is typically referred to as an area border router while the other routers 104a–b and d–g are not area border routers. One or more protocol regions are often autonomous systems. An autonomous system is a collection of networks controlled by a single administrative authority.

In a packet-switched network, the technique used to route a packet through interconnected networks depends on the routing protocol. Most protocols fall into one of two categories, distance-vector algorithms (which make routing path decisions based on a number of router hops a packet traverses en route from the source network to the destination network) and link-state algorithms (which use link state advertisement or LSA (containing the names and various cost metrics of a router's neighbors in a defined area) to keep routers informed about links in the network). Rather than storing the next hop (which is the case with distance-vector algorithms), link-state algorithms store the information needed to generate routing paths. Examples of router protocols using distance-vector algorithms include EIGRP, RIP and RIP-2 and using link-state algorithms include Open Shortest Path First or OSPF, OSI's IS—IS, and Netware's Link Service's Protocol (NLSP).

Routers and other network components are typically managed using a network management system. Network management systems perform network maintenance, identify possible security problems in the network, locate equipment, module, subassembly, and card failures, locate circuit outages, monitor levels of performance (e.g., bit error rates or BERs, loss of synchronization, etc.) and permit rapid and accurate quantification of network usage and traffic levels. Examples of network management systems used for performing the foregoing tasks include Hewlett-Packard's OpenView™, IBM's Netview™, and Digital Equipment Corporation's Enterprise Management Architecture or EMA™.

For optimal operation of network management systems, an accurate, detailed map of the network or OSI layer 3 topologies is commonly required. Such a map not only facilitates operation of the network management system but also permits newly attached hosts to be properly located and configured for the network (to avoid adversely impacting network performance) and existing hosts to be properly located for the newly attached host. In common practice, a detailed map of the network's topology is, in whole or part, unavailable to network management personnel. This can be due to poor record keeping, the sheer size and complexity of some networks, and the lack of central management of a network, such as where a network includes a number of autonomous systems or enterprises.

The discovery of network topology is not a simple task for network administrators. Simple Network Management Protocol or SNMP algorithms for discovering automatically network layer (or OSI Layer 3) topology are used in many network management tools. Such algorithms use only basic IP primitive functionality and are very slow. Typically, the techniques flood the network with ping commands for every possible host or interface address, which can not only interfere with the operational efficiency of the network but also require an extensive use of computational resources to analyze the received information. Although vendor-specific solutions exist, they typically rely on the vendor-specific extensions to the standard SNMP MIBs that are not useful in a typical multi-vendor network. Other known network topology discovery algorithms use the Managed Information Base on MIB information stored by all routing protocols. Every router must be contacted by this algorithm. MIB information is, of necessity, the lowest common denominator-type of information available on all routers, regardless of routing protocol, and cannot contain more information than provided by the weakest link, namely distance-vector algorithms (i.e., information relating to the nearest neighbor only). Contacting every router is problematical because any routers not running SNMP cannot provide the MIB information.

SUMMARY OF THE INVENTION

These and other needs are addressed by the various embodiments and configurations of the present invention. The methods and apparatuses of the present invention obtain routing and/or network-related information to populate the network topology.

In one embodiment of the present invention, the method and apparatus is used for an enterprise network. The network is divided into at least two routing regions. Each region includes first and second sets of routers. In one configuration, a region is an area as defined by the OSPF protocol or an analogy thereof under another protocol. Each router contains information regarding network components and links in the region. The routers in the first sets of routers and, at most, only some of the routers in the second sets of routers are contacted to obtain routing topology information. For example, in the OSPF protocol only area border routers (apart from the initially contacted (or gateway) router) are typically contacted. As will be appreciated, area border routers contain network information about the hosts, links and networks in all of the areas on whose borders they are located while non-area border routers contain information about the hosts, links, and networks in the area in which they are located and at most only summarized (incomplete) information about these components in other areas.

The above embodiments can have a number of advantages. The algorithms can provide an accurate, detailed, and updated map of the network. This permits network administrators not only to properly locate and configure newly attached hosts but also to locate existing hosts for the newly attached host, perform network maintenance, identify possible security problems in the network, and perform rapid and accurate identification of network problems and bottlenecks. The algorithms can provide these benefits at relatively fast speeds and with minimal impact on network traffic and on the operation of the network. Typically, the techniques of the present invention do not flood the network with ping commands for every possible host or interface address, which not only interferes with the operational efficiency of the network but also require an extensive use of computational resources to analyze the vast amounts of received information. Rather, the techniques of the present invention identify only certain routers, such as area border routers, which contain the information necessary to permit a routing or network topology to be generated. In some applications, the algorithms of the present invention query on average only one router per region. The algorithms of the present invention are not limited to vendor-specific architectures. Rather, the algorithms can generate such topologies from a network using a plurality of routing protocols and/or containing computational components from multiple vendors. These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

System Overview

Figure 2:
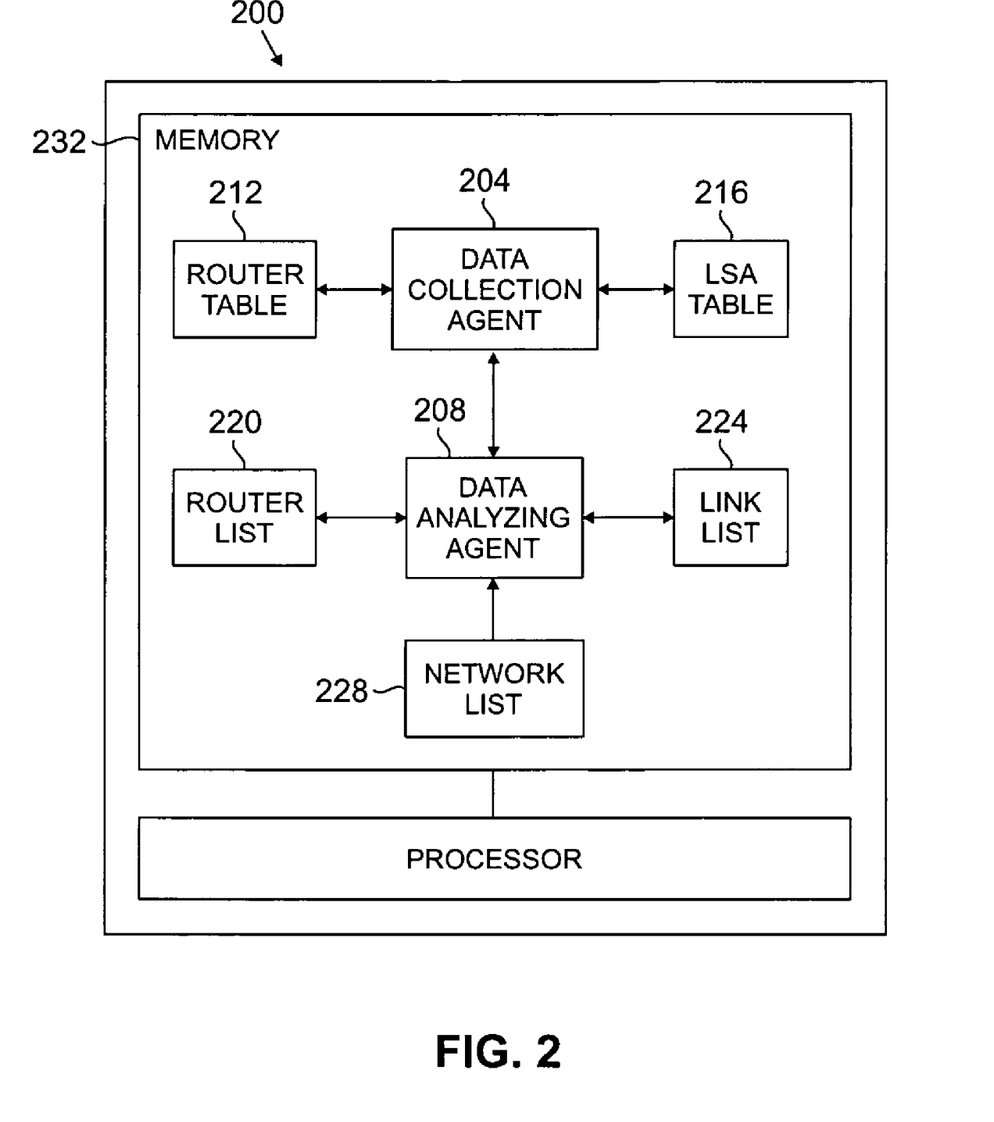
FIG. 2 is a block diagram depicting a computational architecture according to an embodiment of the present invention.

FIG. 2 refers to a network topology generator 200 according to an embodiment of the present invention. The generator 200 is configured to be connected to an access point of a computer network, such as to stub network 112, to send communications to and receive communications from hosts, typically routers. The generator 200 comprises a data collection agent 204 configured to gather selected information regarding the network topology by contacting selected routers in each desired routing region and a data analyzing agent 208 configured to analyze the gathered information and generate an output from which the (OSI Layer 3) network topology can be derived. The data collection agent 204 uses a router table 212 (FIG. 4) to list identified selected routers (and/or interfaces thereof) and determine whether or not the routers have been contacted and, if so, the result. The data collection agent 204 outputs the link state advertisement or LSA table 216 (FIG. 5), which is a listing of link state advertisements or LSAs obtained from the link state databases in the contacted routers. As will be appreciated, the link state database, as defined by the OSPF protocol, is a listing of links with each link being defined by end points and a cost metric associated with the link. Each area border router within a routing region has a complete copy of the database for all regions on whose border the router is located (or with which the area border router is associated). However, the non-area border routers within one routing region typically have a complete copy of the database in the region in which it is located and do not have the same link state database as a router in a different routing region.

Based on the LSA table, the data analyzing agent 208 outputs three or four further tables (depending upon the embodiment), namely, the router list 220 which contains router information (FIG. 7), the link list 224 which contains link information (FIG. 8), the network list 228 which contains network information (FIG. 9), and the interface list 1100 which contains router interface information (FIG. 11). These tables collectively provide the network routing topology and the attributes of the network elements represented therein. As will be appreciated, "routing topology" refers to the logical network topology described by a particular routing protocol. Based on the router, link, network, and/or interface lists, a map or model of the routing topology can be generated automatically or manually. If more than one routing protocol is in use, there may be more than one distinct routing topology. As will be appreciated, the routing topology can be quite different from the physical network topology.

Before discussing the operation of the data collection and analyzing agents 208, it is important to understand certain features of the OSPF protocol. A router is typically identified by a unique router ID and is associated with a unique area ID. A router typically does not itself have an IP address. An interface is a logical device belonging to a host such as a router that can be the attachment point of a link. Typically, an interface will have zero or one IP address and belong to a network. The interface will normally have an interface number and a network mask. A link contains two or more bindings of a source interface and a metric or cost. It is templated by the metric representation which is specific to the routing protocol and represents the cost for a packet to leave an interface. A link is typically associated with a cost metric and a routing protocol identifier. A network object represents a data network or subnet. It has an address and a mask and represents an address space in which a set of hosts is contained. A network object may derive its address and/or its mask from its member interfaces if these values have not been set by the data collection agent 204.

The Data Collection Agent

Figure 3:
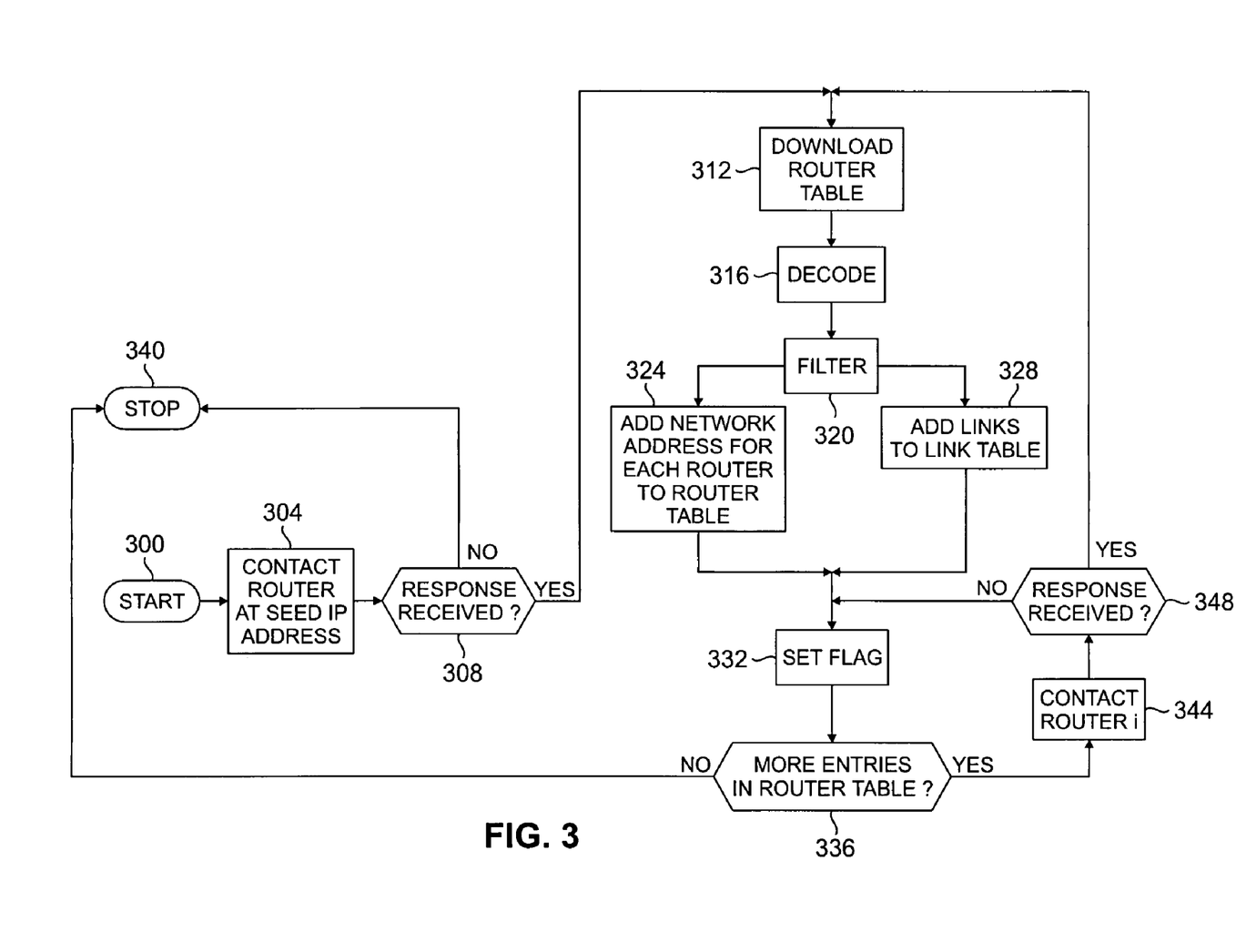
FIG. 3 is a flowchart depicting the operation of the data collection agent.

Referring now to FIG. 3 operation of the data collection agent 204 will now be discussed.

In step 300, the data collection agent 204 is created.

The data collection agent 204 in step 304 uses one or more seed IP addresses to contact a host router in one or more selected routing regions. The router(s) contacted initially by the data collection agent 204 are hereinafter referred to as a gateway router(s). In a preferred implementation, only one seed IP address is employed. If the user has not configured the data collection agent 204 to use a particular router as the initial gateway, the seed address can be determined automatically. The method by which this is determined is platform-dependent. For all platforms, the gateway is taken from the first routing table entry that has a valid gateway field. The Simple Network Management Protocol or SNMP techniques used to contact the gateway router can be routing protocol specific. For example, RFC1850 provides the specifications for contacting a router using the OSPF protocol-specific techniques for SNMP.

In decision diamond 308, the data collection agent 204 determines whether the gateway router has responded to the generator 200 within a predetermined time period. If not, the data collection agent 204 terminates operation and notifies the user of an error and requests a further seed address. If so, the data collection agent 204 proceeds to step 312.

In step 312, the data collection agent 204 downloads the link state database of the gateway router into memory 232.

Next, the data collection agent 204, in step 316, decodes the downloaded link state database by known techniques. Generally, the data collection agent 204 parses the tightly compacted binary data and converts it into an internal representation of the database in which the various fields and field entries in the link state database are identified and grouped together. This step is important to permit the information to be filtered in later steps.

The techniques used in the decoding step are protocol specific. Each protocol's specifications define how the database is configured and therefore mandate how the database is to be converted into a useable format. In the OSPF protocol, for example, the byte-stream containing OSPF LSAs packed in network byte order are transformed into a sequence of well-defined structures. The LSAs are taken from the ospfLsdb Table in the OSPF MIB (OSPFMIB). The agent 204 uses the Lsa::Parse( ) method to retrieve the corresponding Lsa object. The class hierarchy uses a decorator pattern or other suitable design to work around the fact that the LSA must be partially parsed before the correct Lsa subclass can be created. Processing of the retrieved Lsa subclass object is performed using any suitable design, such a visitor pattern.

In the filtering step 320, any LSAs for computational components outside the current routing region are discarded. In the filtering step, the data collection agent 204 is interested in identifying and recording LSA information for computational components in the current region (in which the gateway router is a part) and information for at least one area border router serving the current region. Because in a preferred configuration the data collection agent 204 contacts only area border routers and/or their associated interfaces, LSA information for computational components in other routing regions can be obtained from an area border router serving that routing region. The information about area border routers (and/or their associated interfaces) can be obtained from the link state database and/other tables in the gateway router.

Figure 4:
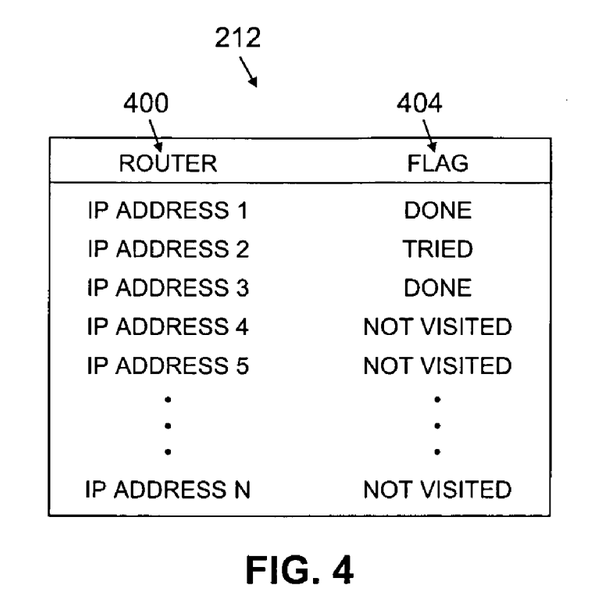
FIG. 4 depicts a router table output by the data collection agent.

The data collection agent 204, in step 324, adds the IP address (and/or router identifier) of each area border router and/or area border router interface in the database to the router table. The router table is used to identify the area border routers (and/or their attached interfaces) for later contacting by the data collection agent 204. An example of the router table is shown in FIG. 4 in which a router or router interface is identified by an IP address 400 and is associated with a flag state 404 (which is discussed in detail below).

In one configuration, the area border routers are added to the area border router table only if they are associated with (or located on a border of) a selected region (which is typically within the enterprise network or autonomous system). In other words, area border routers that are only associated with regions that are not of interest are not added to the area border router table. In some configurations, the algorithm is self-limiting in that the algorithm only adds area border routers to the table 212 if the routers are configured according to a selected routing protocol and/or otherwise contactable. The routing protocol is used in all regions of the enterprise network but is typically not used in regions outside of the enterprise network. Even if the undesired regions use the routing protocol, the regions are part of another autonomous system having different credentials which must be known to gain access to the router's databases. These credentials are typically not known to those that are not part of the autonomous system. Accordingly, the area border routers in such undesired regions will ultimately not provide information in their databases to the data collection agent 204. In another configuration, the data collection agent 204 will add the area border router to the table 212 and/or contact the area border router only if the area border is associated with an IP address falling within a predetermined set of IP addresses. This configuration permits the data collection agent 204 to collect information only about some but not all regions of an enterprise network. In yet another configuration, the data collection agent 204 can notify the user whenever a new region is discovered and query the user whether or not the region is of interest to the user and therefore whether or not the area border routers associated with that region and/or their respective interfaces are to be added to the router table 212 and the link state advertisements associated with that region are to be added to the LSA table 216.

Figure 5:
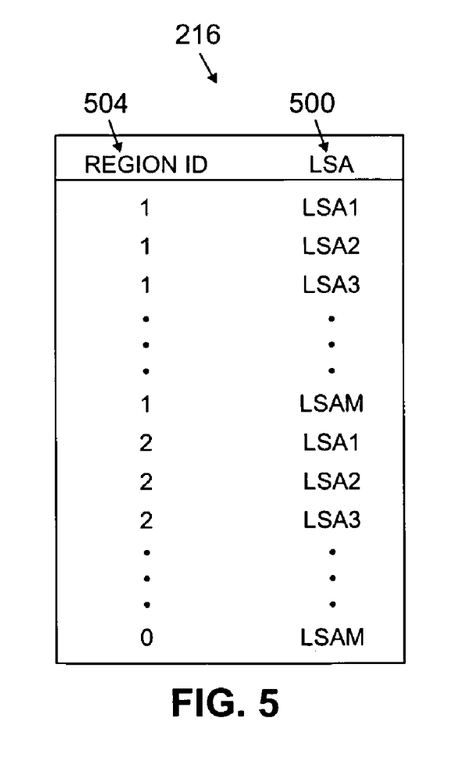
FIG. 5 depicts an LSA table output by the data collection agent.

In step 328, the data collection agent 204 further adds all LSA information in the current region to the link table. Each listed LSA 500 has a corresponding region identifier 504 (which is defined by the applicable routing protocol).

The data collection agent 204, in step 332, sets the flag 404 (FIG. 4) for an existing router entry and for each of the newly added router entries. The flag can have any of the states below:

NOTVISITED: No attempt has yet been made to contact the area border router.

TRIED: An attempt to process the area border router has failed. Further attempts to contact the router can be allowed, depending on the configuration.

DONE: Either the area border router has been successfully visited and processed or it cannot be processed. In either case, no further attempts are made to process the area border router.

As will be appreciated, the area border router and the LSA tables 212 and 216 are initially empty. The initial gateway router is determined to be an area border router when it contains more than one entry in the ospfAreaId row (for OSPF protocol). If the initial gateway router is an area border router, it is added to the area border router table 212 with a status of DONE.

If the initial gateway router is not an area border router, the starting point for processing a region is a region identification and a host router. The link state database for the specified region is retrieved from the host router. The link state database is available from the OSPF MIB (OSPFMIB) in the ospfLsdbTable (for OSPF protocol). Each LSA is then added to the LSA table 216 and the area border routers of the current region identified and added to the area border router table 212 with a status of NOTVISITED. .

In step 336, the data collection agent 204 sequentially scans the area border router table 212 and determines whether there are unprocessed entries in the table. There are three cases to consider:

All the table members have the status DONE. In this case, the algorithm is finished and proceeds to step 340.

There is at least one list member with the status NOT VISITED. In this case, the algorithm picks one of these and proceeds to step 344.

There are no members with a status of NOTVISITED, but there is at least one with a state of TRIED. In this case, the algorithm picks one of these and proceeds to step 344.

In step 344, the data collection agent 204 contacts the selected area border router and in step 348 determines if a response was received within a predetermined time interval. If a response was received within the time interval, the data collection agent 204 returns to step 312. If no response was received within the time interval, the data collection agent 204 sets the flag for unsuccessfully contacted router to "DONE" and returns to step 332 to select another area border router to contact.

When the data collection agent 204 repeats steps 312, 316, 320, 324, 328 and 332 for an area border router, the steps are performed the same way as for the gateway router with certain exceptions. In step 332, if the area border router (or its corresponding interfaces) has no known IP addresses, the corresponding entry in the area border router table is upgraded from NOTVISITED to TRIED or from TRIED to DONE. Otherwise, in step 320 the ospfAreaId row of the OSPF MIB area table (OSPFMIB) is read using SNMP. This provides a list of all the regions of which the area border router is a member. If there is an SNMP error, the host is marked in step 332 as DONE. In step 328, for each area border router that is successfully visited, the data collection agent 204 examines each area attached to the area border router. If the area already exists in the LSA table 216, the area is discarded and the next area examined. Otherwise, the area identifier and area border router information are processed as noted above in reference to step 328 for an area border router.

Data Analyzing Agent

Figure 6:
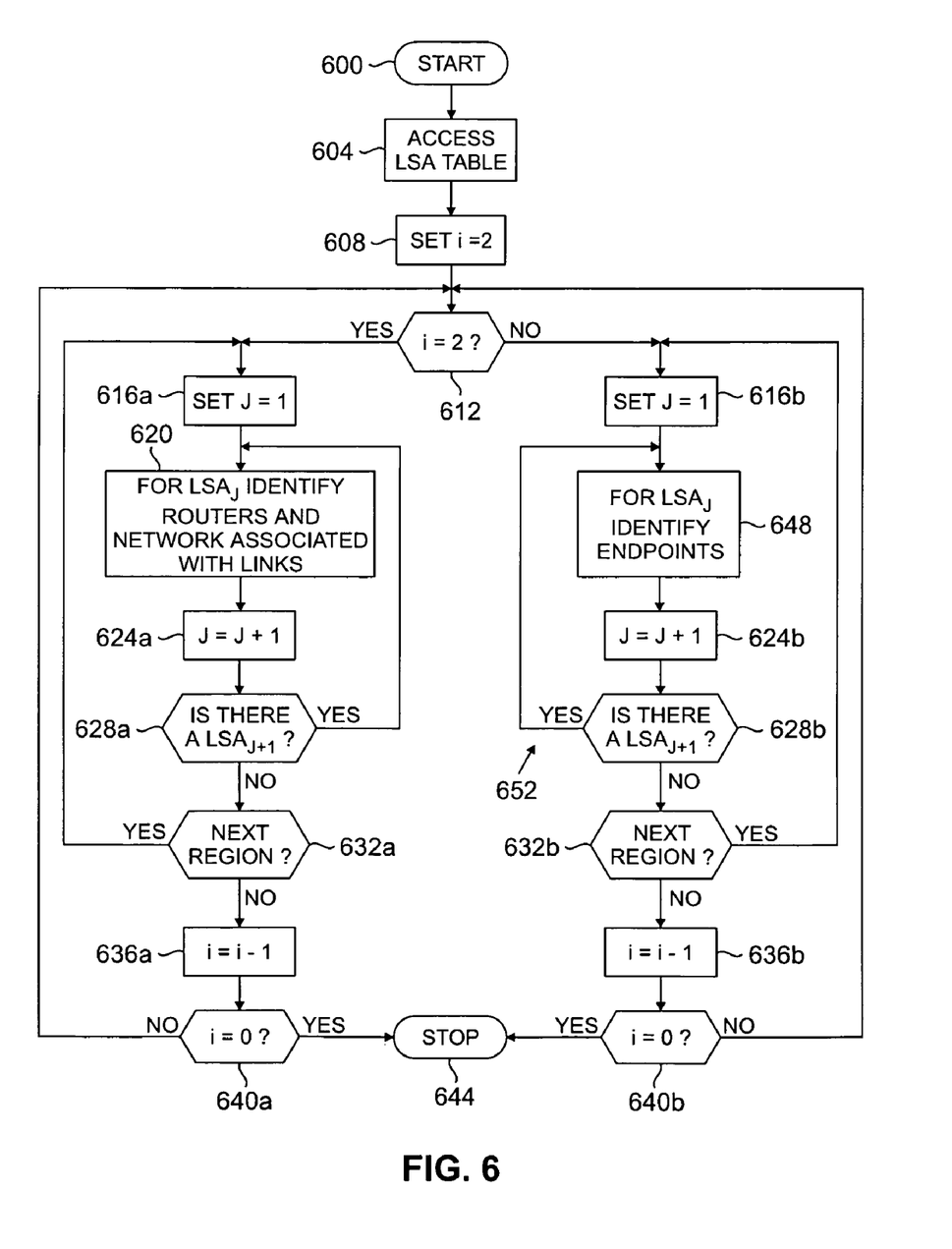
FIG. 6 is a flowchart depicting the operation of the data analyzing agent.

FIG. 6 depicts the operation of the data analyzing agent 208.

The data analyzing agent 208 is created in step 600 and accesses the Link State Advertisement or LSA table in step 604.

The data analyzing agent 208 in step 608 sets i equal to 2. I is a counter used to control which link types are to be considered. The LSA table 216 is traversed in reverse numerical order based on LSA type. LSA type 2 is considered before LSA type 1. This ordering enables the algorithm to make a number of assumptions about the state of the network model data structures when processing router advertisements.

As will be appreciated, in the OSPF protocol there are at least seven LSA types, namely LSA type 1 is a router advertisement, LSA type 2 is a network advertisement, LSA type 3 is a network summary, LSA type 4 is an autonomous system or AS-border router summary, LSA type 5 is AS external advertisement, LSA type 6 is a group membership advertisement, and LSA type 7 is an advertisement used in NSSA areas. Because the agent 208 is concerned only with the current routing protocol domain, external route advertisements are ignored. Summary advertisements, and advertisements of an unrecognized type are also ignored. In the configuration of FIG. 6, LSA types 3, 4, and 6 are ignored. Only LSA types 1 and 2 are considered. In other configurations, the other LSA types, such as LSA types 3 and 4, are also considered. As will be appreciated, the LSA types to be ignored can be discarded either by the data analyzing agent 208 or by the data collection agent 204 in filtering step 320 of FIG. 3, as desired.

In decision diamond 612, the agent 208 determines whether i is equal to 2. When the value is equal to 2 (or a type 2 LSA is to be considered), the agent 208 proceeds to step 616a (discussed below), and when the value is not equal to 2 (or a type 1 LSA is to be considered) the agent 208 proceeds to step 616b (discussed below).

In steps 616a and b, a second counter J is set equal to 1. J is used to refer to the LSA in the set of LSAs associated with each region. This relationship is illustrated in FIG. 5. For region 1, LSA 1 is the first LSA in the set; LSA 2 the second, and so forth.

In step 620, the data analyzing agent 208 selects the first type 2 LSA in the set of LSAs for the first area, or with reference to FIG. 5 the area having id 1. As will be appreciated, in the OSPF protocol type 2 LSAs are originated for broadcast and NBMA networks that appear as transit networks in the OSPF topology.

Step 620 can be performed in several ways.

In one configuration, interfaces are not specifically considered. The data analyzing agent 208 parses the LSA and, for each type 2 LSA, identifies routers and a network associated with a link defined by the advertisement. In the OSPF protocol, the LSA will normally identify a designated router and one or more attached routers. The objects in the LSA are instantiated and listed in the router, network, and/or link listings 220, 224, and 228, respectively, as appropriate.

In another configuration, interfaces are considered as well as other network components. For each type 2 LSA, a transit network object is constructed to represent the network, and router objects are constructed to represent each attached router. The link state ID is used to create an interface for the advertising (designated) router. Interfaces are created for all the attached routers named in the advertisement but IP addresses are not assigned to these interfaces since they are not specified in the advertisement. The OSPF data attributes are set for each new router that is created. The advertising router is recorded as being the designated router for the new transit network.

In step 624a, J is set to J+1, and in step 628a, the data analyzing agent 208 determines if there is in the LSA table 216 a type 2 LSA corresponding to the selected area and to the incremented counter. If there is such an LSA, the data analyzing agent 208 returns to step 620. If there is no such LSA, the data analyzing agent 208 proceeds to step 632a.

In step 632a, the data analyzing agent 208 determines if there is region (i.e., area as defined by OSPF) in the LSA table 216 which has yet to be considered. If there is such an area, the data analyzing agent 208 selects that area and repeats steps 620, 624a, and 628a for that area. If all of the areas have been considered, the data analyzing agent 208 proceeds to step 636a.

In step 636a, i is decremented, and in step 640a, the data analyzing agent 208 determines if i is equal to zero. If i is not equal to zero, the data analyzing agent 208 returns to step 612, and if i is equal to zereo the data analyzing agent 208 proceeds to step 644 and terminates execution of the algorithm.

The loop 652 is the same as the above loop except that the loop is executed for a type 1 LSA.

Step 648 differs from step 620 in a number of respects. As will be appreciated in the OSPF protocol certain LSA types have extensions. A type 1 LSA, for example, can be a combination of 4 types of router links: namely, a point-to-point link (subtype 1), a point-to-transit-network link (subtype 2), a point-to-stub-network link (subtype 3), and a virtual link (subtype 4). The virtual link is ignored. There are two reasons for this: first, the link described by the virtual link does not really exist in the routing topology but the virtual link uses the inter-area routing of its transit area to forward packets and second the IP address information in the link data field cannot be used since there is no indication of which interface the IP address should be assigned to.

Like step 620, step 648 can be performed in a number of ways.

In one configuration, interfaces are not specifically considered. The data analyzing agent 208 parses the LSA and identifies the endpoints referenced in the LSA. The endpoints will be either a router and/or a transit or stub network. In the OSPF protocol, the LSA will normally identify a designated router and one or more attached routers. The objects in the LSA are instantiated and listed in the router, network, and/or link listings 220, 228, and 224, respectively, as appropriate.

In another configuration, interfaces are considered along with other network components, and the extensions may be handled differently. Generally, each interface is identified by matching or pairing up corresponding type 1 and 2 LSAs. The matching is done by finding an interface IP address in each LSA that is the same, i.e., the interface IP address of the advertising router. Regarding point-to-point links, such links do not require IP addresses and therefore require special handling of LSAs. The problem is that for unnumbered point-to-point links, there is no way of telling whether the link data field contains an IP address or an interface index. Because in the OSPF protocol any participants in a numbered point-to-point link must issue a subtype 3 router link in conjunction with a subtype 1 router link, any point-to-point link (which will have a corresponding subtype 1 router link) that has no corresponding subtype 3 router link (i.e., is assumed to be unnumbered. This condition can be detected by known techniques. The subtype 1 router link specifies the router ID of the far end of the link and the IP address (for a numbered link) or interface number (for an unnumbered link) of the outgoing interface. If a numbered link cannot be distinguished from an unnumbered link by the existence of the corresponding subtype 3 link, the link is added to a set of outstanding subtype 1 links and processed only when the corresponding subtype 3 link is encountered. The subtype 2 router link specifies a point-to-point link from a router to the designated router for a transit network. Since the agent 208 has already processed the corresponding type 2 advertisement, both the advertising router and the designated router objects have already been created and are members of a common transit network. For both the advertising router and the designated router, the subtype 2 router link allows the addition of an IP address to the interface that connects the transit network. When all LSA processing is completed, any outstanding subtype 1 links in the set of outstanding subtype 1 links must be unnumbered point-to-point links and new objects are constructed to represent such links. The outgoing interface of the advertising router is assigned an interface number but no IP address.

In the latter configuration of step 648, the data analyzing agent 208 typically identifies at least most of the host (router) interfaces by IP address. When that is not the case (e.g., an interface of a router connected to a stub network), the corresponding router is polled to obtain this information.

Figure 7:
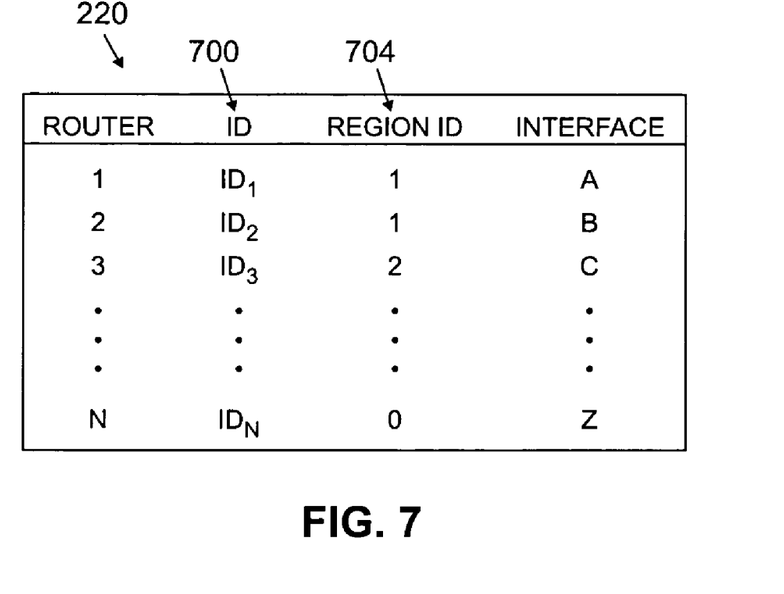
FIG. 7 depicts a router list output by the data analyzing agent.
Figure 8:
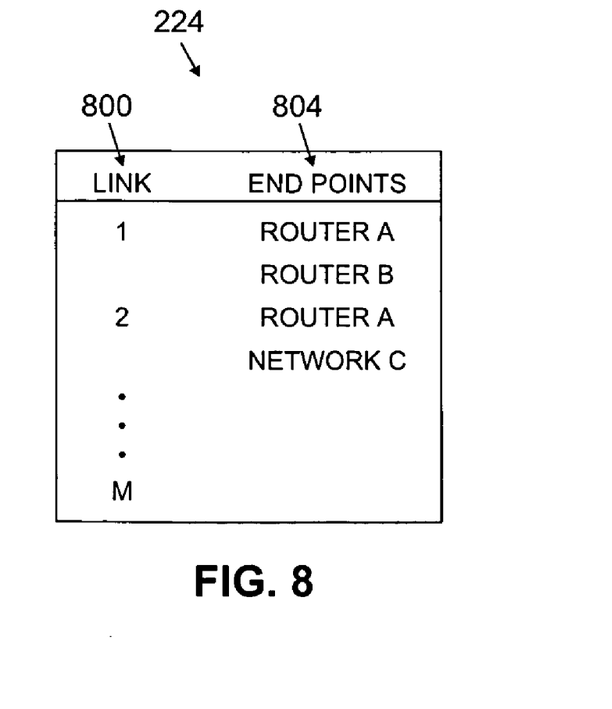
FIG. 8 depicts a link list output by the data analyzing agent.
Figure 9:
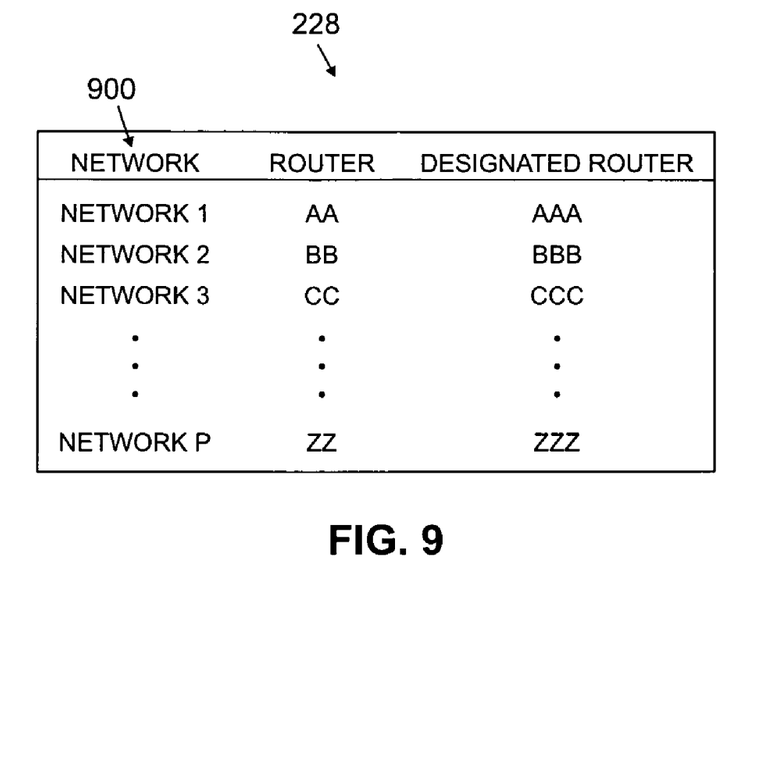
FIG. 9 depicts a network list output by the data analyzing agent.
Figure 10:
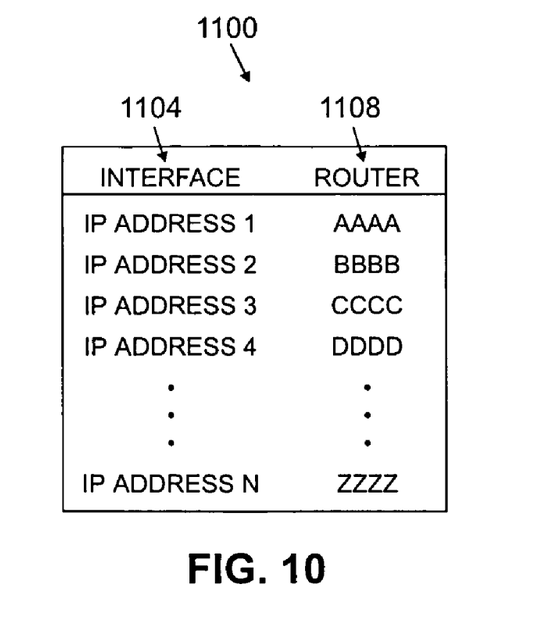
FIG. 10 depicts an interface list output by the data analyzing agent.

The output linked listings are shown in FIGS. 7–9. FIG. 7 is a comprehensive listing of routers, both designated and attached, in the enterprise network or autonomous system. The routers are identified by router ID 700 (and/or by IP address (not shown)), associated region identifiers 704, and/or by one or more pointers referencing associated interfaces in the interface list. As will be appreciated, an area border router will have multiple region ids while a non-area border router will have only one, and a router can have one or more associated interfaces. FIG. 8 is a list of links. The links 800 can have as endpoints 804 two routers, or a router and a network (stub or transit). The routers can be identified by router ID and/or interface IP address, and the network by mask and/or one or more IP addresses. Alternatively, the associated link endpoints can be referred to by a pointer to the appropriate entry in another of the lists 220, 228, and 1100. FIG. 9 is a listing of networks (stub or transit). The networks can be identified by a mask and/or one or more IP addresses 900. Each network has an associated router interface 904 (which is typically indicated by a pointer to the corresponding router interface in the interface list), and an associated designated router (which is typically indicated by a pointer to the corresponding router in the router list). When interfaces are considered, a fourth list 1100 of interfaces can be generated as shown in FIG. 10. In the interface list 1100, interfaces 1104 are identified by IP address, interface number, and/or network mask and is associated with a router 1108. The associated router 1108 is typically indicated by a pointer to the corresponding router in the router list 220.

In most applications, the data analyzing agent 208 will output the router and network lists and one of the link and interface lists.

The objects in the network model are typically self-managed objects. A self-managed object is an object whose lifetime is managed not by its clients but by the class that it instantiate. The model is implemented by one or more classes containing a static set of pointers to instances. The data analyzing agent 208 adds and removes the object to/from the static set. All the objects of the network model, with the exception of the interface, are self-managed. Interface objects are owned and managed by the host objects to which they are directly attached.

A number of variations and modifications of the invention can be used. It would be possible to provide for some features of the invention without providing others.

For example in one alternative embodiment, the algorithm is used for a protocol other than OSPF. The algorithm can be used for any distance-vector and link-state algorithms which configure routers into groups based on the information stored in the router and/or divide an enterprise or autonomous system into regions.

In another embodiment, the data collection and data analyzing agents are implemented in whole or part as an application specific integrated circuit or other type of logic circuit.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. For improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. As may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patent able subject matter.

What is claimed is:

1. A method for determining a topology associated with a distributed processing network, comprising:
    selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;
    contacting a first router in the second set of routers to determine at least one of the routers in the first set of routers, the first router not being in the first set of routers;
    thereafter contacting each of the routers in the first set of routers but not each of the other routers in the second set of routers, the first set of routers having fewer members than the second set of routers;
    accessing network information maintained by at least some of the contacted routers in the first set of routers;
    setting a flag value for each of the routers in the first set of routers, wherein the flag value depends upon the state of the contact with the associated router and/or router interface; and
    generating a representation of the network topology in the selected network region based on the accessed network information.

2. The method of claim 1, wherein in the contacting step an interface associated with each of the routers in the first set is contacted and wherein the first router is not located on a boundary between adjacent network regions.

3. The method of claim 2, wherein the plurality of network regions correspond with a plurality of areas as defined by the Open Shortest Path First protocol and wherein the network is an enterprise network.

4. The method of claim 3, wherein each of the routers in the first set of routers is an area border router.

5. The method of claim 3, wherein at least some of the routers in the second set of routers are not an area border router.

6. The method of claim 1, wherein the generating step comprises:
    maintaining a router table listing one or more attributes of at least one of (i) each of the routers in the first router set and (ii) one or more interfaces associated with each of the routers in the first router set and excluding one or more attributes associated with each of the other routers and/or an interface attached thereto in the second router set.

7. The method of claim 6, wherein the accessing step comprises:
    setting a flag for each of the listed routers and/or interfaces indicating an outcome of the contacting step.

8. The method of claim 1, wherein the network information comprises link state advertisements and wherein the generating step comprises:
    storing the link state advertisements in a link state advertisement table, wherein the link state advertisements are indexed by an associated area.

9. The method of claim 7, wherein the generating step comprises:
    determining a link state advertisement type for a plurality of the link state advertisements in the link state advertisement table, wherein higher numbered link state advertisement types are processed before lower numbered link state advertisement types.

10. The method of claim 1, wherein in the generating step the representation is a listing of routers, links, interfaces, and networks.

11. The method of claim 1, wherein the generating step comprises:
    discarding at least some of the information based on at least one of a type of the information and a type of link associated with the information.

12. The method of claim 11, wherein the type of link is a type of state advertisement and the type of information is an extension type associated with a link state advertisement.

13. The method of claim 11, wherein the at least one of a type of the information and a type of link is a type of the information.

14. The method of claim 11, wherein the at least one of a type of the information and a type of link is a type of link.

15. The method of claim 1, wherein the plurality of network regions comprises first network regions and second network regions and wherein the generating step comprises:
    discarding network information associated with one or more selected first network regions; and
    updating a listing of network information associated with one or more selected second network regions.

16. The method of claim 1, wherein the accessing step outputs a link state advertisement table listing a plurality of link state advertisements and selected network regions associated with link state advertisement and, for each selected network region, interactively performing the following steps:
selecting a link state advertisement associated with the selected network region;
parsing the selected link state advertisement;
constructing at least one of router, interface, link, and network objects referenced in the selected link state advertisement, the object containing information in the selected link state advertisement; and
repeating the selecting, parsing, and constructing steps until each link state advertisement associated with the selected network region has been considered.

17. The method of claim 16, wherein the interactively performed steps further comprise:
comparing a first link state advertisement associated with the selected network region with a second link state advertisement associated with the selected network region; and when the first and second link state advertisements correspond to one another, constructing an interface object containing information contained in the first and second link state advertisements.

18. The method of claim 16, wherein in the interactively performed steps the following rule is employed:
where a point-to-point link having no corresponding stub network link is assumed to be unnumbered.

19. The method of claim 16, wherein the following additional steps are performed in the interactively performed steps:
comparing a first link state advertisement associated with the selected network region with a second link state advertisement associated with the selected network region; and
when the first and second link state advertisements correspond to one another, identifying at least one attribute of at least one of a router, interface, link, and network.

20. The method of claim 1, wherein, in the thereafter contacting and accessing steps, the plurality of network regions and network region topology are determined, and wherein, in the contacting step and thereafter contacting and accessing steps, signals transmitted to at least some of the contacted routers cross over a boundary between adjacent defined network regions.

21. The method of claim 1, wherein the network topology corresponds to OSI Layer 3 topology.

22. The method of claim 1, wherein the at least some of the contacted routers in the first set of routers exclude at least one router in the first set of routers because the at least one router is configured according to one or more selected routing protocols.

23. The method of claim 1, further comprising:
at least one of not contacting and not accessing network information in a router when the router is associated with an IP address that is not a member of a set of IP addresses.

24. The method of claim 1, further comprising:
at least one of not contacting and not accessing network information in a router when the router is in a network region that is not a member of a set of network regions.

25. The method of claim 1, further comprising:
querying a user whenever a Previously Presented region is discovered to determine whether or not the discovered region is of interest to the user.

26. The method of claim 1, wherein, in the generating step, virtual link information is ignored.

27. The method of claim 1, further comprising:
accessing network information from the at least some of the contacted routers in the first set of routers only when the at least some of the contacted routers use one or more selected routing protocols.

28. A system for determining a topology associated with a distributed processing network, comprising:
means for extracting a first set of routers from among a larger, second set of routers in at least a selected portion of a distributed processing network, wherein the routers in the first set of routers are also members of the second set of routers, wherein the second set of routers comprises routers that are not in the first set of routers, wherein the first set of routers is located in a plurality of network regions, wherein the plurality of network regions are defined by at least one routing protocol, and wherein at least two of the network regions are defined by a common routing protocol;
means for contacting a first router in the second set of routers to determine at least one of the routers in the first set of routers, the first router not being in the first set of routers, and thereafter contacting each of the routers in the first set of routers but not each of the other routers in the second set of routers;
means for accessing network information maintained by at least some of the contacted routers in the first set of routers;
means for setting a flag value for each of the routers in the first set of routers, wherein the flag value depends upon the state of the contact with the associated router; and
means for generating a representation of the network topology in the selected portion of the distributed processing network based on the accessed network information.

29. The system of claim 28, wherein the first and second sets of routers are associated with the plurality of regions.

30. The system of claim 28, wherein the plurality of regions are a plurality of areas as defined by the Open Shortest Path First protocol.

31. The system of claim 28, wherein each of the routers in the first set of routers is an area border router.

32. The system of claim 28, wherein at least one of the routers in the second set of routers is not an area border router and wherein the first router is not an area border router.

33. The system of claim 28, further comprising:
a router table listing each of the routers in the first set of routers but not each of the routers in the second set of routers.

34. The system of claim 28, wherein the information comprises link state advertisements and further comprising:
means for storing the link state advertisements in a link state advertisement table, wherein the link state advertisements are indexed by an associated area.

35. The system of claim 34, further comprising:
means for determining a link state advertisement type for a plurality of the link state advertisements in the link state advertisement table, wherein higher numbered link state advertisement types are processed before lower numbered link state advertisement types.

36. The system of claim 28, further comprising:
means for processing the information to form a listing of routers, links, and networks.

37. The system of claim 28, further comprising:
filtering means for discarding at least some of the information based on at least one of a type of the information and a type of link associated with the information.

38. The system of claim 37, wherein the at least one of a type of the information and a type of link is a type of the information.

39. The system of claim 37, wherein the at least some of the information based on at least one of a type of the information and a type of link associated with the information is a type of link.

40. The system of claim 28, wherein the means for contacting transmits signals to at least some of the contacted routers across a boundary between adjacent defined network areas when the means for contacting and means for accessing determine the network regions and topology in each network region.

41. The system of claim 28, wherein the network topology corresponds to OSI Layer 3 topology.

42. A system for determining a topology associated with a distributed processing network, comprising:
  a data collection agent to (a) select a first set of routers from among a larger, second set of routers in at least a selected portion of a distributed processing network, wherein the routers in the first set of routers are also members of the second set of routers, wherein the second set of routers comprises routers that are not in the first set of routers, wherein the first set of routers are located in a plurality of network regions, wherein the plurality of network regions are defined by at least one routing protocol, and wherein at least two of the network regions are defined by a common routing protocol, (b) contact a first router in the second set of routers to determine at least one of the routers in the first set of routers, the first router not being in the first set of routers, and thereafter contact each of the routers in the first set of routers but not each of the other routers in the second set of routers, and (c)load network information maintained by at least some of the contacted routers in the first set of routers;
  a flag value associated with each of the routers in the first set of routers, wherein the flag value depends upon the state of the contact with the associated router; and
  a data analyzing agent for generating a representation of the network topology of the selected portion of the distributed processing network based on the loaded network information.

43. The system of claim 42, wherein the first and second sets of routers are associated with the plurality of regions and wherein the first router is not located on a boundary between adjacent network regions.

44. The system of claim 43, wherein the plurality of regions are a plurality of areas as defined by the Open Shortest Path First protocol.

45. The system of claim 42, wherein each of the routers in the first set of routers is an area border router.

46. The system of claim 42, wherein at least one of the routers in the second set of routers is not an area border router.

47. The system of claim 42, further comprising:
  a router table listing each of the routers in the first set of routers but not each of the other routers in the second set of routers.

48. The system of claim 42, wherein the information comprises link state advertisements and further comprising:
  a link state advertisement table containing a plurality of link state advertisements indexed by an associated area.

49. The system of claim 48, wherein the data analyzing agent is further operable to determine a link state advertisement type for a plurality of the link state advertisements in the link state advertisement table, wherein higher numbered link state advertisement types are processed before lower numbered link state advertisement types, and process each of the link state advertisements based on the determined link state advertisement type.

50. The system of claim 42, wherein the data analyzing agent is further operable to process the network information to form a listing of routers, links, and networks.

51. The system of claim 42, wherein the data analyzing agent is further operable to process the network information and output a network model and wherein at least one of the data collection and data analyzing agents is configured to discard at least some of the information based on at least one of a type of the information and a type of link associated with the information.

52. The system of claim 51, wherein the at least one of a type of the information and a type of link associated with the information is a type of the information.

53. The system of claim 51, wherein the at least one of a type of the information and a type of link associated with the information is a type link.

54. The system of claim 42, wherein the data collection agent transmits signals to at least some of the contacted routers across a boundary between adjacent defined network regions when the data collection agent determines the network regions and topology in each network region.

55. The system of claim 42, wherein the network topology corresponds to OSI Layer 3 topology.

56. A method for determining a topology associated with a distributed processing network, comprising:
  selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;
  contacting a first router in the second set of routers to determine at least one of the routers in the first set of routers, the first router not being in the first set of routers;
  thereafter contacting each of the routers in the first set of routers but not each of the other routers in the second set of routers, the first set of routers having fewer members than the second set of routers;
  accessing network information maintained by at least some of the contacted routers in the first set of routers;
  generating a representation of the network topology in the selected network region based on the accessed network information;
  maintaining a router table listing one or more attributes of at least one of (i) each of the routers in the first router set and (ii) one or more interfaces associated with each of the routers in the first router set and excluding one or more attributes associated with each of the other routers and/or an interface attached thereto in the second router set; and
  setting a flag for each of the listed routers and/or interfaces indicating an outcome of the contacting step.

57. A method for determining a topology associated with a distributed processing network, comprising:
  selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers, wherein the network information comprises link state advertisements;

generating a representation of the network topology in the selected network region based on the accessed network information;

storing the link state advertisements in a link state advertisement table, wherein the link state advertisements are indexed by an associated area; and determining a link state advertisement type for a plurality of the link state advertisements in the link state advertisement table, wherein higher numbered link state advertisement types are processed before lower numbered link state advertisement types.

58. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers, wherein the network information comprises link state advertisements;

wherein the accessing step outputs a link state advertisement table listing a plurality of link state advertisements and selected network regions associated with link state advertisement and, for each selected network region, interactively performing the following steps according to a rule stating where a point-to-point link has no corresponding stub network link the point-to-point link is assumed to be unnumbered:

(i) selecting a link state advertisement associated with the selected network region;

(ii) parsing the selected link state advertisement;

(iii) constructing at least one of router, interface, link, and network objects referenced in the selected link state advertisement, the object containing information in the selected link state advertisement;

(iv) repeating the selecting, parsing, and constructing steps until each link state advertisement associated with the selected network region has been considered; and generating a representation of the network topology in the selected network region based on the accessed network information.

59. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers, wherein the at least some of the contacted routers in the first set of routers exclude at least one router in the first set of routers because the at least one router is configured according to one or more selected routing protocols;

accessing network information maintained by at least some of the contacted routers in the first set of routers; and generating a representation of the network topology in the selected network region based on the accessed network information.

60. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers;

at least one of not contacting and not accessing network information in a router when the router is associated with an IP address that is not a member of a set of IP addresses; and generating a representation of the network topology in the selected network region based on the accessed network information.

61. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers;

generating a representation of the network topology in the selected network region based on the accessed network information; and querying a user whenever a Previously Presented region is discovered to determine whether or not the discovered region is of interest to the user.

62. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers;

generating a representation of the network topology in the selected network region based on the accessed network information, wherein virtual link information is ignored.

63. A method for determining a topology associated with a distributed processing network, comprising:

selecting a network region from among a plurality of network regions, the network region containing first and second sets of routers, wherein the routers in the first set of routers are also members of the second set of routers, wherein the second set of routers comprises routers that are not in the first set of routers, wherein the plurality of network regions are defined by at least one routing protocol, and wherein at least two of the network regions are defined by a common routing protocol;

contacting a first router in the second set of routers to determine at least one of the routers in the first set of routers, the first router not being in the first set of routers;

thereafter contacting each of the routers in the first set of routers but not each of the other routers in the second set of routers, the first set of routers having fewer members than the second set of routers;

accessing network information maintained by at least some of the contacted routers in the first set of routers;

accessing network information from the at least some of the contacted routers in the first set of routers only when the at least some of the contacted routers use one or more selected routing protocols; and generating a representation of the network topology in the selected network region based on the accessed network information.

64. A system for determining a topology associated with a distributed processing network, comprising:

a data collection agent to (a) select a first set of routers from among a larger, second set of routers in at least a selected portion of a distributed processing network, wherein the routers in the first set of routers are also members of the second set of routers, wherein the second set of routers comprises routers that are not in the first set of routers, wherein the first set of routers are located in a plurality of network regions, wherein the plurality of network regions are defined by at least one routing protocol, and wherein at least two of the network regions are defined by a common routing protocol, (b) contact a first router in the second set of routers to determine at least one of the routers in the first set of routers, the first router not being in the first set of routers, and thereafter contact each of the routers in the first set of routers but not each of the other routers in the second set of routers, and (c) load network information maintained by at least some of the contacted routers in the first set of routers, wherein the loaded network information comprises link state advertisements;

a link state advertisement table containing a plurality of link state advertisements indexed by an associated area; and a data analyzing agent for generating a representation of the network topology of the selected portion of the distributed processing network based on the loaded network information and determining a link state advertisement type for a plurality of the link state advertisements in the link state advertisement table, wherein higher numbered link state advertisement types are processed before lower numbered link state advertisement types, and process each of the link state advertisements based on the determined link state advertisement type.

* * * * *